United States Patent
Hsu

(10) Patent No.: US 9,346,513 B2
(45) Date of Patent: May 24, 2016

(54) FIBROUS COMPOSITE FRAME

(71) Applicant: FULL TECH COMPOSITE MANUFACTURING COMPANY, Zhongshan, Grangdong Province (CN)

(72) Inventor: Hsiucheng Hsu, Zhongshan (CN)

(73) Assignee: Full Tech Composite Manufacturing Company, Zhongshan, Guangdong Province (CN)

( * ) Notice: Subject to any disclaimer, the term of this patent is extended or adjusted under 35 U.S.C. 154(b) by 0 days.

(21) Appl. No.: 14/443,946

(22) PCT Filed: Feb. 7, 2013

(86) PCT No.: PCT/CN2013/071512
§ 371 (c)(1),
(2) Date: May 19, 2015

(87) PCT Pub. No.: WO2014/121487
PCT Pub. Date: Aug. 14, 2014

(65) Prior Publication Data
US 2015/0291244 A1    Oct. 15, 2015

(51) Int. Cl.
*B62K 19/02* (2006.01)
*B62K 19/16* (2006.01)
*B62K 3/02* (2006.01)

(52) U.S. Cl.
CPC .............. *B62K 19/02* (2013.01); *B62K 19/16* (2013.01); *B62K 3/02* (2013.01)

(58) Field of Classification Search
CPC .......... B62K 3/00; B62K 19/16; B62K 19/22; B62K 19/18
USPC .................. 280/281.1, 274, 288.2, 288.3
See application file for complete search history.

(56) References Cited

U.S. PATENT DOCUMENTS

| 4,613,146 | A | * | 9/1986 | Sharp et al. ............... 280/288.2 |
| 4,856,801 | A | * | 8/1989 | Hollingsworth ............. 280/284 |
| 5,411,280 | A | * | 5/1995 | Allsop et al. .............. 280/281.1 |
| 5,445,400 | A | * | 8/1995 | Martin et al. ............. 280/281.1 |
| 5,456,481 | A | * | 10/1995 | Allsop et al. ............. 280/281.1 |
| 5,533,742 | A | * | 7/1996 | Peart ......................... 280/281.1 |
| 2002/0066254 | A1 | | 6/2002 | Ebbinghaus |
| 2007/0063476 | A1 | * | 3/2007 | Yu ............................... 280/279 |

FOREIGN PATENT DOCUMENTS

| CN | 1113471 A | 12/1995 |
| CN | 2734604 Y | 10/2005 |

(Continued)

*Primary Examiner* — Anne Marie Boehler
(74) *Attorney, Agent, or Firm* — Muncy, Geissler, Olds & Lowe, P.C.

(57) ABSTRACT

A fibrous composite frame includes at least one frame unit. The frame unit has two components and at least one shaft formed by combining the two components. Each of the components has a foam core that is made of a foam material and a fiber composite outer layer that wraps the foam core from outside and is made of a fiber composite material. The fiber composite outer layer has a combining surface, and the two components are such fixedly combined at the combining surfaces of the fiber composite outer layers that the two components are substantially symmetrical about where the two components are combined. Thereby, the fiber composite bicycle frame is lightweight, unlikely to break and easy to produce. Also, the fiber composite material is more likely to be set compactly.

3 Claims, 5 Drawing Sheets

(56) References Cited

FOREIGN PATENT DOCUMENTS

| CN | 1789070 | A | 6/2006 |
| CN | 2928662 | Y | 8/2007 |
| GB | 1431308 | * | 4/1976 |
| JP | 7-117772 | A | 5/1995 |

* cited by examiner

FIBROUS COMPOSITE FRAME

BACKGROUND OF THE INVENTION

1. Technical Field

The present invention relates to frames of bicycles, and more particularly to a fibrous composite frame.

2. Description of Related Art

While most early bicycle frames made of aluminum alloy are structurally robust and heavy in weight, the modern bicycles are usually designed with frames made of carbon-fiber composite materials that is also tough yet much lighter than aluminum alloy, so as to answer to the trend of light weight.

For using a carbon-fiber composite material to make a bicycle frame, the carbon-fiber composite material is shaped by wrapping an inflatable member, and after the bicycle frame is formed, the inflatable member is deflated and withdrawn from the formed bicycle frame. Such a manufacturing process is complicated and inconvenient. Especially, a bicycle frame is constructed by plural tubes, and it is more than difficult to use the foregoing manufacturing process to produce tubes linked as a unitary member. Furthermore, since the inflatable member is somehow soft even when fully inflated, it is almost impossible that the carbon-fiber composite material closely wraps the inflatable member. Moreover, the formed carbon-fiber composite bicycle frame is a tubular, hollow structure, so in the event that the material is not sufficiently thick, the frame tends to break. On the other hand, if the thickness of the material is increased, the desire for light weight would be sacrificed.

BRIEF SUMMARY OF THE INVENTION

In view of the shortcomings of the prior art, the primary objective of the present invention is to provide a fibrous composite frame, which light-weight, unlikely to break and easy to produce. Also, the fiber composite material is more likely to be set compactly.

For achieving the aforementioned objective, the disclosed fibrous composite frame comprises at least one frame unit, including two components and at least one shaft formed by combining the two components, each said component having a foam core that is made of a foam material and a fiber composite outer layer that wraps the foam core from outside and is made of a fiber composite material, the fiber composite outer layer having a combining surface, and the two components being such fixedly combined at the combining surfaces of the fiber composite outer layers that the two components are substantially symmetrical about where the two components are combined.

Thereby, a bicycle frame can be formed by a unitary frame unit or by plural frame units. In either of the forms, the fiber composite bicycle frame is made without involving inflating and deflating an inflatable member used in the prior art, so the manufacturing process is simplified. Additionally, since the foam used as a core is more rigid than the inflatable member used in the prior art, the fiber composite material can wrap the foam core more compactly. Even if the fiber composite outer layer acting as the shaft wall of the bicycle frame has a very thin, the foam core can absorb impact effectively. Moreover, the two components have their fiber composite outer layers combined as an I-beam structure, so the bicycle frame is light yet unbreakable.

While the detailed structure, features, fabrication and use of the disclosed fibrous composite frame will be described below, people skilled in the relevant art would understand that the detailed description and embodiments for embodying the present invention are intended to illustrate the present invention, but not form any limitations to the scope of the present invention that is defined in the appended claims.

DETAILED DESCRIPTION OF THE INVENTION

In the description below, unless otherwise noted, like elements or structural features will be identified by identical numbers throughout all figures and embodiments.

Figure 1:
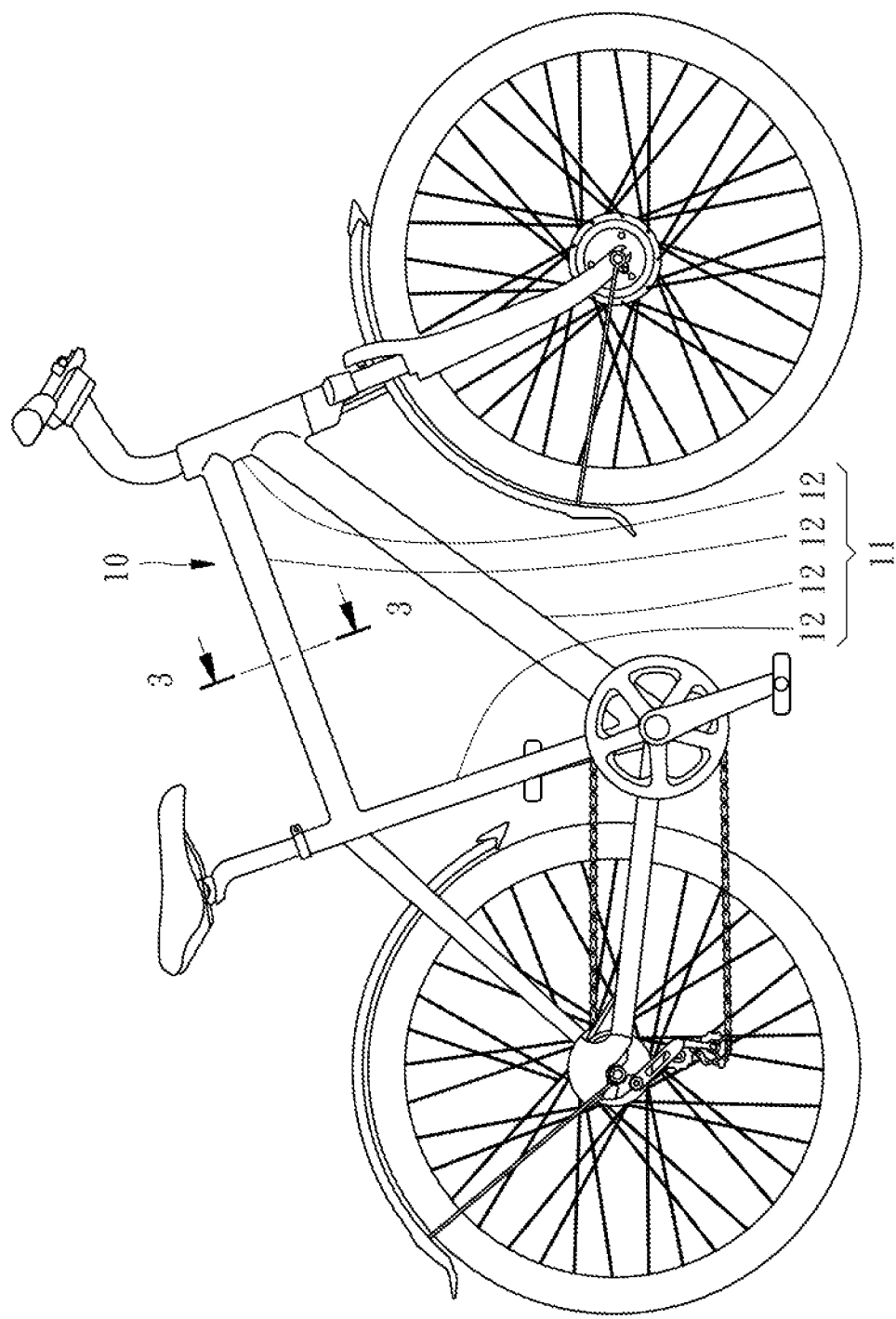
FIG. 1 is a schematic drawing showing a bicycle having a fiber composite bicycle frame according to a first preferred embodiment of the present invention.

Referring to FIG. 1, in a first preferred embodiment of the present invention, a fibrous composite frame 10 comprises a frame unit 11. The frame unit 11 has four shafts 12. The shafts 12 act as a head tube, a top tube, a down tube and a seat tube of a conventional bicycle frame, respectively. The shafts 12 are linked into a closed quadrilateral.

Figure 2:
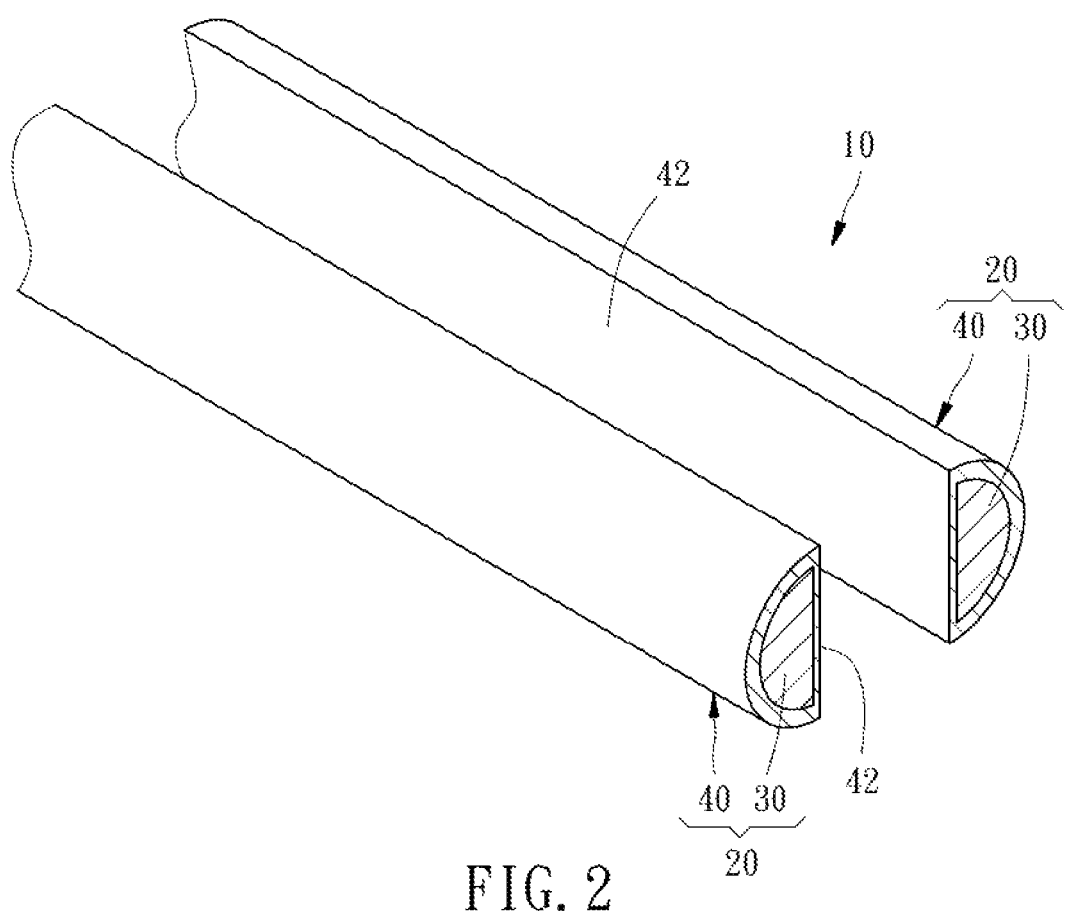
FIG. 2 is a partial, exploded view of the fiber composite bicycle frame of the first preferred embodiment of the present invention.
Figure 3:
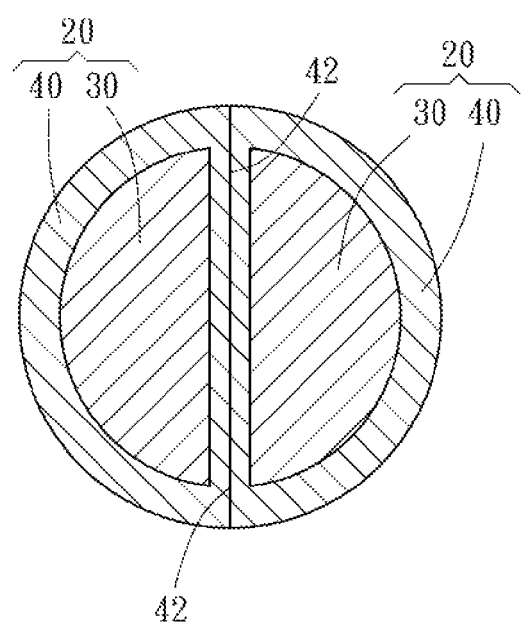
FIG. 3 is a cross-sectional view of the bicycle frame taken along Line 3-3 of FIG. 1.
Figure 4:
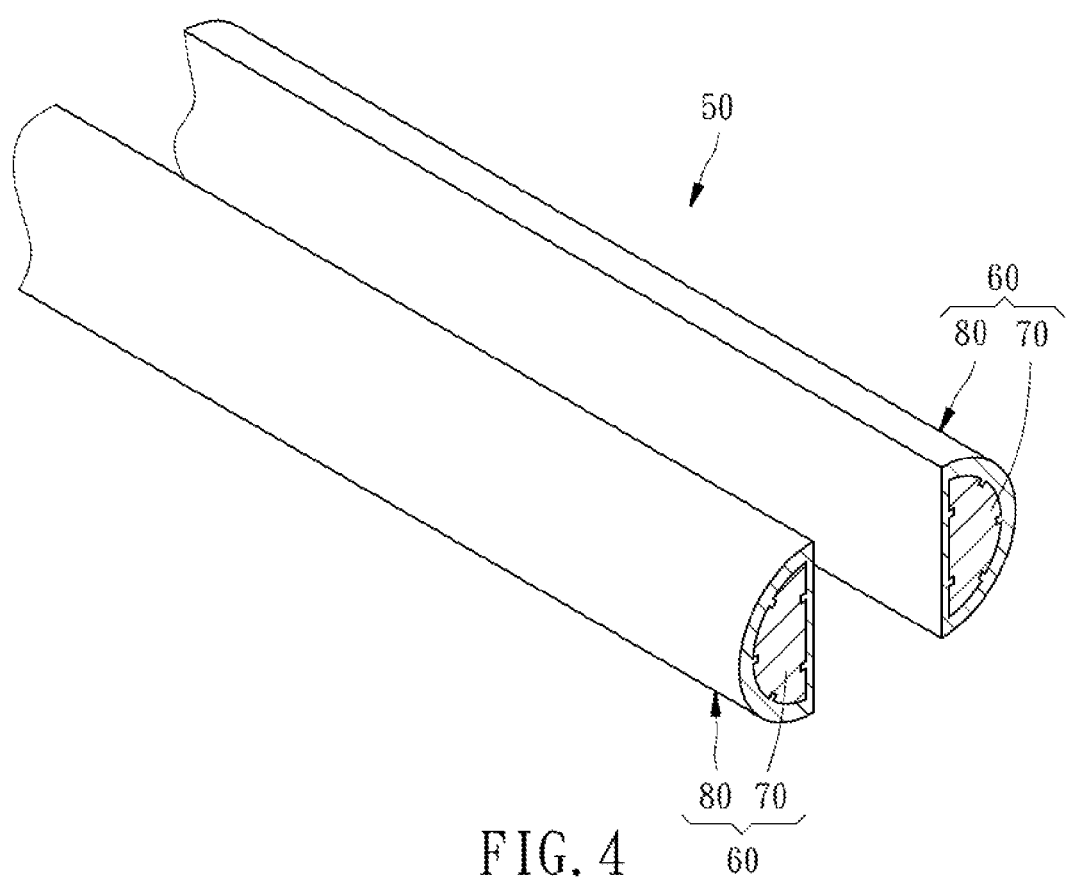
FIG. 4 is a partial, exploded view of the fiber composite bicycle frame according to a second preferred embodiment of the present invention.
Figure 5:
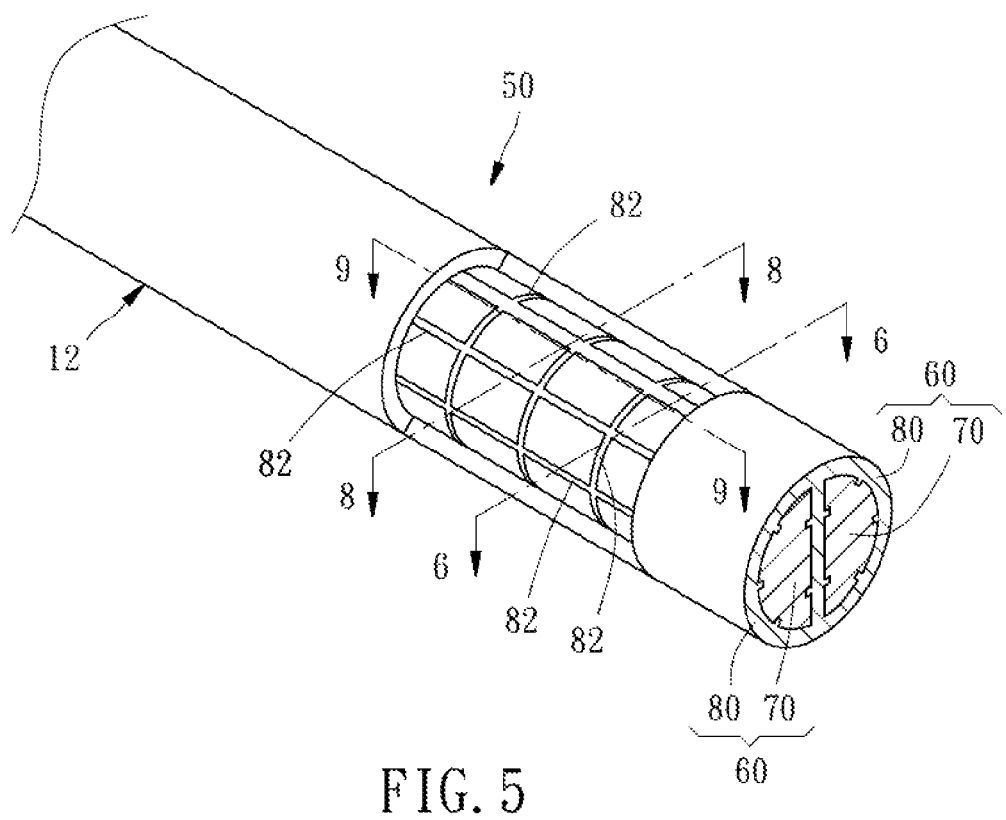
FIG. 5 is an assembled view of FIG. 4, wherein the fiber composite bicycle frame has a part of its fiber composite outer layer removed for showing the interior.
Figure 6:
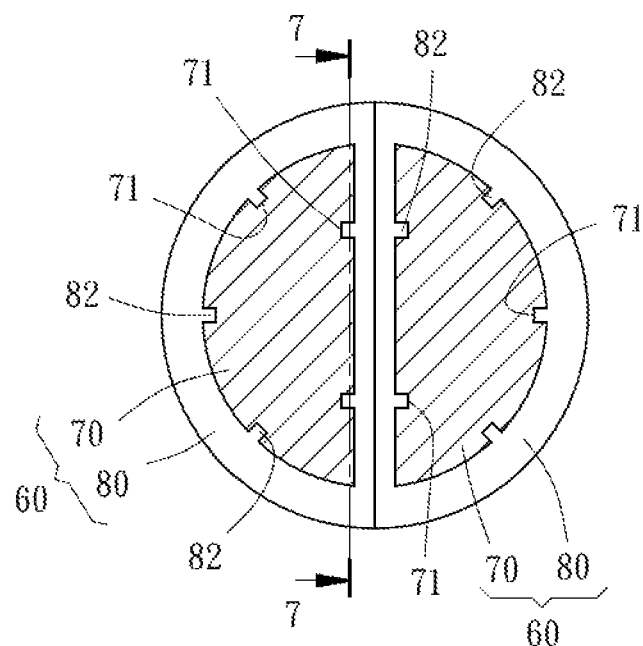
FIG. 6 is a cross-sectional view of the bicycle frame taken along Line 6-6 of FIG. 5.
Figure 7:
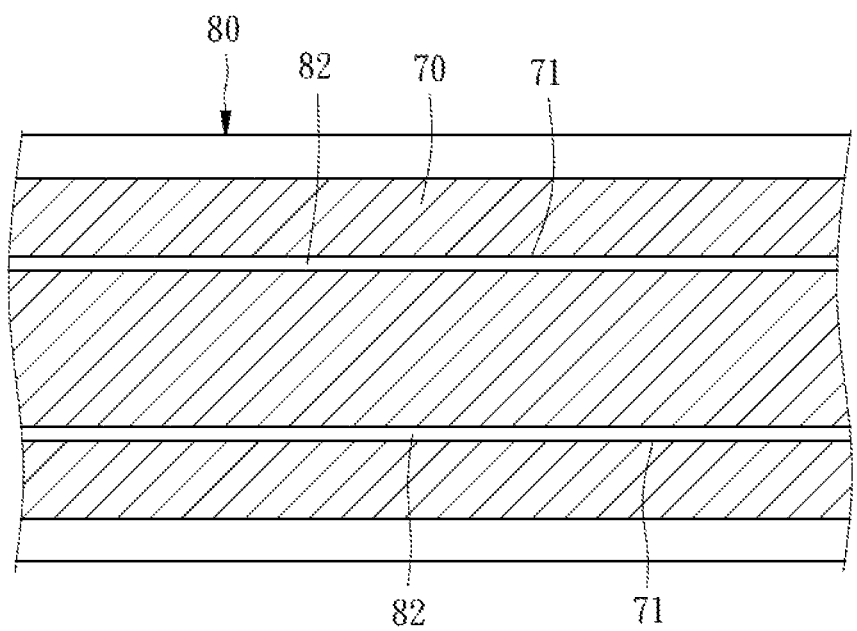
FIG. 7 is a cross-sectional view of the bicycle frame taken along Line 7-7 of FIG. 6.
Figure 8:
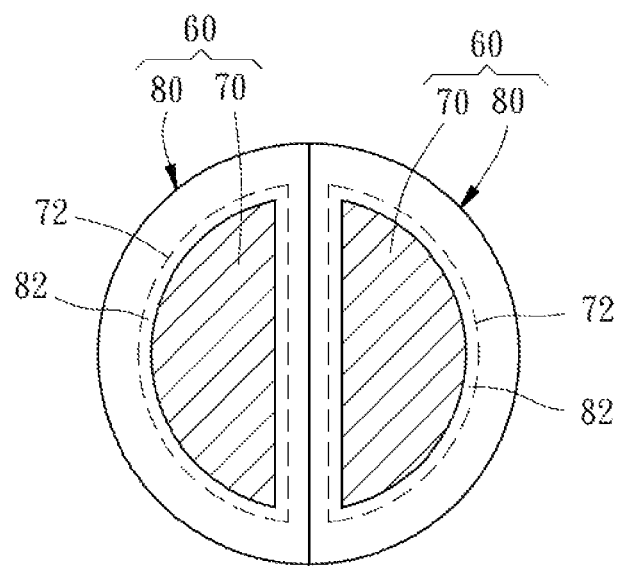
FIG. 8 is a cross-sectional view of the bicycle frame taken along Line 8-8 of FIG. 5.
Figure 9:
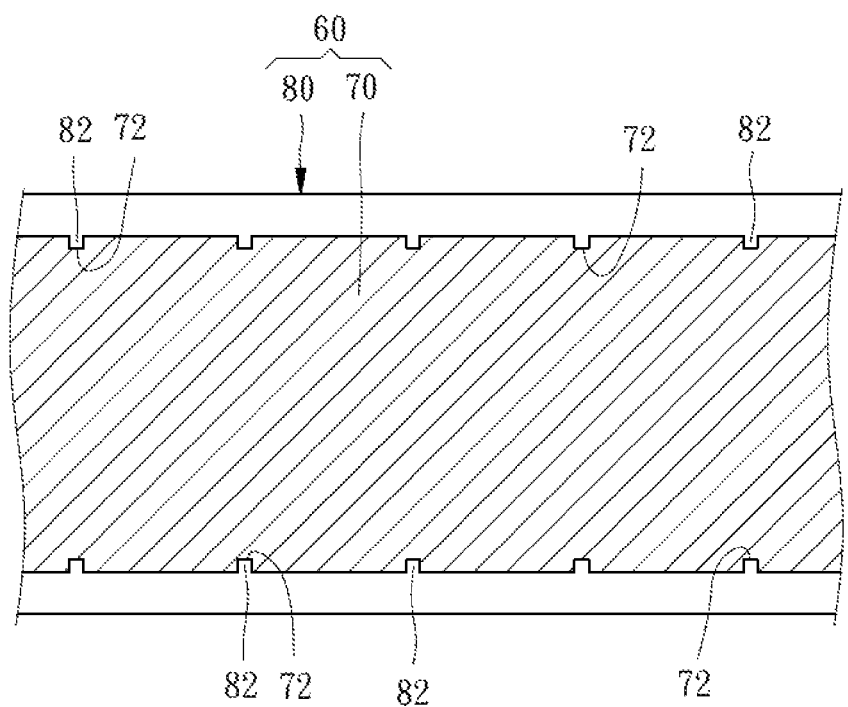
FIG. 9 is a cross-sectional view of the bicycle frame taken along Line 9-9 of FIG. 5.

As shown in FIG. 1 through FIG. 3, the frame unit 11 comprises two components 20. Each said shaft 12 is constructed from the two components 20. In other words, the components 20 are also shaped as a closed quadrilateral like the frame unit 11. For the sake of convenient illustration, FIG. 2 only shows a part of the shaft 12 formed by the two components 20. In the present embodiment, each said shaft 12 is a cylindrical body, so each said component 20 is formed by combining four semi cylindrical members, but the present invention may be embodied in other ways without limitation.

Each said component 20 has a foam core 30, and a fiber composite outer layer 40 wrapping the foam core 30 from outside. The fiber composite outer layer 40 has a combining surface 42. The foam core 30 is made of a foam material, such as polyurethane (PU) foam or polycarbonate (PC) foam, which is highly tough and resistant to impacts. The fiber composite outer layer 40 is made of carbon fiber, fiberglass or other polyester fiber composite materials, which is rigid, low-specific-gravity, resistant to high heat and anti-corrosive. In the present embodiment, the fiber composite outer layer 40 is made of carbon fiber. The two components 20 are fixedly combined at the combining surfaces 42 of their fiber composite outer layers 40 by means of hot press. After combined, the two components 20 are substantially symmetrical about where they are combined.

With the foregoing configuration, the bicycle frame 10 is lightweight. Additionally, in virtue of the foam core 30, the bicycle frame 10 forms a solid structure. Therefore, even if the fiber composite outer layer 40 has a very small thickness, the strength of the bicycle frame 10 against breakage is ensured by the foam core 30 that absorbs impacts and the two components 20 that have their fiber composite outer layers 40 combined as an I-beam structure. Moreover, the fiber composite bicycle frame 10 is made without involving inflating and deflating an inflatable member used in the prior art, so the manufacturing process is simplified. Additionally, since the foam core 30 used as a core is more rigid than the inflatable member used in the prior art, the fiber composite material can wrap the foam core 30 more compactly.

While the bicycle frame in the above-mentioned embodiment is formed by a unitary frame unit 11, in other embodiments, the disclosed fiber composite bicycle frame may comprise plural frame units. For example, four said frame units may be used to form the shafts 12, respectively. In other words, according to the present invention, the bicycle frame may be constructed from plural said frame units. Each of the frame units is constructed by combining the two components each formed by the foam core and the fiber composite outer layer, and then connecting the frame units at their fiber composite outer layers by means of hot press, so as to form the bicycle frame.

It is to be noted that the present invention features for using two symmetrical components to construct a frame unit, which not only provides the I-beam structure that ensures the strength of the fiber composite bicycle frame, but also allows the process for wrapping the foam core with the fiber composite material to be performed more conveniently and effectively.

Referring to FIG. 4 through FIG. 9, in a second preferred embodiment of the present invention, a fibrous composite frame 50 similar to the fiber composite bicycle frame 10 described previously is provided with the difference that the bicycle frame 50 has its components 60 made of a foam core 70 that has grooves 71, 72 intersecting with each other as a grid-like pattern. The grooves 71, 72 include plural axial grooves 71 that extend substantially along an axis of the shaft 12, and plural annular grooves 72 that run across the axial grooves and circle the foam core 70. In the present embodiment, each of the annular grooves 72 is substantially perpendicular to the axis of the shaft 12 (or perpendicular to the axial grooves 71), but the implement of the present invention is not limited thereto. Alternatively, the foam core 70 may only have either the axial grooves 71 or the annular grooves 72. When making the component 60 by wrapping the foam core 70 with a fiber composite outer layer 80, a part of the fiber composite outer layer 80 enters the grooves 71, 72 of the foam core 70, thereby forming reinforcing ribs 82. This not only enhances the structural strength of the frame 50 but also improves the combination between the fiber composite outer layer 80 and the foam core 70. The pattern and the number of the grooves 71, 72, and in turn the pattern and the number of the reinforcing ribs 82 formed on the component 60, are not limited to those shown in the present embodiment, provided that the foam core 70 has a groove-like structure that can be filled by the fiber composite outer layer 80.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A fibrous composite frame, comprising:
a plurality of frame units each said comprising a fiber composite outer layer that is connected to a fiber composite outer layer of another said frame unit, each frame unit including two components and at least one shaft formed by combining the two components, each said component having a foam core that is made of a foam material the fiber composite outer layer wrapping the foam core from outside and being made of a fiber composite material, the fiber composite outer layer having a combining surface, and the two components being such fixedly combined at the combining surfaces of the fiber composite outer layers that the two components are substantially symmetrical about where the two components are combined and said foam core of each said component has at least one groove, and the groove is filled by a part of the fiber composite outer layer of each said component, so that the part of the fiber composite outer layer in the groove forms at least one reinforcing rib,
wherein the foam core is a rod member having a flat surface and a convex surface,
wherein the at least one groove includes at least one first axial groove that is axially recessed on the flat surface of the foam core, at least one second axial groove that is axially recessed on the convex surface of the foam core, and at least one annular groove that is annularly and continuously recessed on the flat surface and the convex surface of the foam core.
wherein the fiber composite outer layer is a tubular member having an inner flat surface abutted with the flat surface of the foam core, an inner concave surface that faces the inner flat surface and is abutted with the convex surface of the foam core, an outer convex surface, and said combining surface,
wherein the at least one reinforcing rib includes at least one first axial reinforcing rib that is connected with and formed on the inner flat surface of the fiber composite outer layer, at least one second axial reinforcing rib that is connected with and formed on the inner concave surface of the fiber composite outer layer, and at least one annular reinforcing rib that is annularly and continuously connected to and formed on the inner flat surface and the inner concave surface of the fiber composite outer layer, and
wherein that at least one first axial reinforcing rib protrudes in a direction different from a direction in which that at least one second axial reinforcing rib protrudes.

2. The fibrous composite frame of claim 1, wherein each frame unit comprises plural said shafts that are connected into a closed shape.

3. The fibrous composite frame of claim 1, wherein the fiber composite material is a carbon-fiber composite material.

* * * * *